(12) United States Patent
Jeong

(10) Patent No.: US 10,427,572 B2
(45) Date of Patent: Oct. 1, 2019

(54) HEADREST FOLDING DEVICE

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/772,423

(22) PCT Filed: Oct. 11, 2016

(86) PCT No.: PCT/KR2016/011336
§ 371 (c)(1),
(2) Date: Apr. 30, 2018

(87) PCT Pub. No.: WO2017/086600
PCT Pub. Date: May 26, 2017

(65) Prior Publication Data
US 2018/0319303 A1 Nov. 8, 2018

(30) Foreign Application Priority Data

Nov. 18, 2015 (KR) .......................... 10-2015-0162006

(51) Int. Cl.
| | |
|---|---|
| *B60N 2/847* | (2018.01) |
| *B60N 2/80* | (2018.01) |
| *B60N 2/844* | (2018.01) |
| *B60N 2/856* | (2018.01) |
| *B60N 2/874* | (2018.01) |

(52) U.S. Cl.
CPC ............... *B60N 2/847* (2018.02); *B60N 2/80* (2018.02); *B60N 2/844* (2018.02); *B60N 2/856* (2018.02); *B60N 2/874* (2018.02)

(58) Field of Classification Search
CPC ........ B60N 2/847; B60N 2/844; B60N 2/874; B60N 2/856; B60N 2/80
See application file for complete search history.

(56) References Cited

U.S. PATENT DOCUMENTS

| 7,575,282 | B2 * | 8/2009 | Sutter, Jr. | ............... | B60N 2/876 297/403 |
| 7,740,319 | B2 * | 6/2010 | Furukawa | ................ | B60N 2/20 297/408 |
| 8,157,320 | B2 * | 4/2012 | Sayama | ............... | B60N 2/3011 297/61 |

(Continued)

FOREIGN PATENT DOCUMENTS

| KR | 10-2005-0103429 | 10/2005 |
| KR | 10-2008-0094385 | 10/2008 |

(Continued)

*Primary Examiner* — Philip F Gabler
(74) *Attorney, Agent, or Firm* — Sunstein Kann Murphy & Timbers LLP

(57) ABSTRACT

The present invention relates to a headrest folding device, more particularly, to a headrest folding device wherein a ratchet is connected between a release lever and a lock link which maintains the unfolding (upright) of a headrest, so that the operation of the release lever is not directly transferred to the lock link, but rather indirectly transferred to the lock link through the ratchet, thereby smoothing the operation of the release lever.

9 Claims, 17 Drawing Sheets

(56) References Cited

U.S. PATENT DOCUMENTS

| | | | | |
|---|---|---|---|---|
| 8,226,170 | B2* | 7/2012 | Lutzka | B60N 2/3009 |
| | | | | 297/408 |
| 9,333,884 | B2* | 5/2016 | Tachikawa | B60N 2/3013 |
| 9,980,570 | B2* | 5/2018 | Jeong | A47C 3/38 |
| 2005/0029853 | A1* | 2/2005 | Gauthier | A47C 7/38 |
| | | | | 297/408 |
| 2007/0236069 | A1* | 10/2007 | Chung | B60N 2/859 |
| | | | | 297/408 |
| 2011/0084534 | A1* | 4/2011 | Sohn | B60N 2/859 |
| | | | | 297/408 |
| 2012/0068517 | A1 | 3/2012 | Yetukuri et al. | |
| 2015/0266401 | A1* | 9/2015 | Grable | B60N 2/844 |
| | | | | 297/408 |
| 2015/0366353 | A1 | 12/2015 | Jeong | |
| 2019/0118687 | A1* | 4/2019 | Jeong | B60N 2/853 |

FOREIGN PATENT DOCUMENTS

| | | |
|---|---|---|
| KR | 10-2009-0047671 | 5/2009 |
| KR | 10-0943327 | 2/2010 |
| KR | 10-1080313 | 11/2011 |
| KR | 10-1404478 | 6/2014 |
| KR | 10-1428664 | 8/2014 |

\* cited by examiner

[Fig. 1]
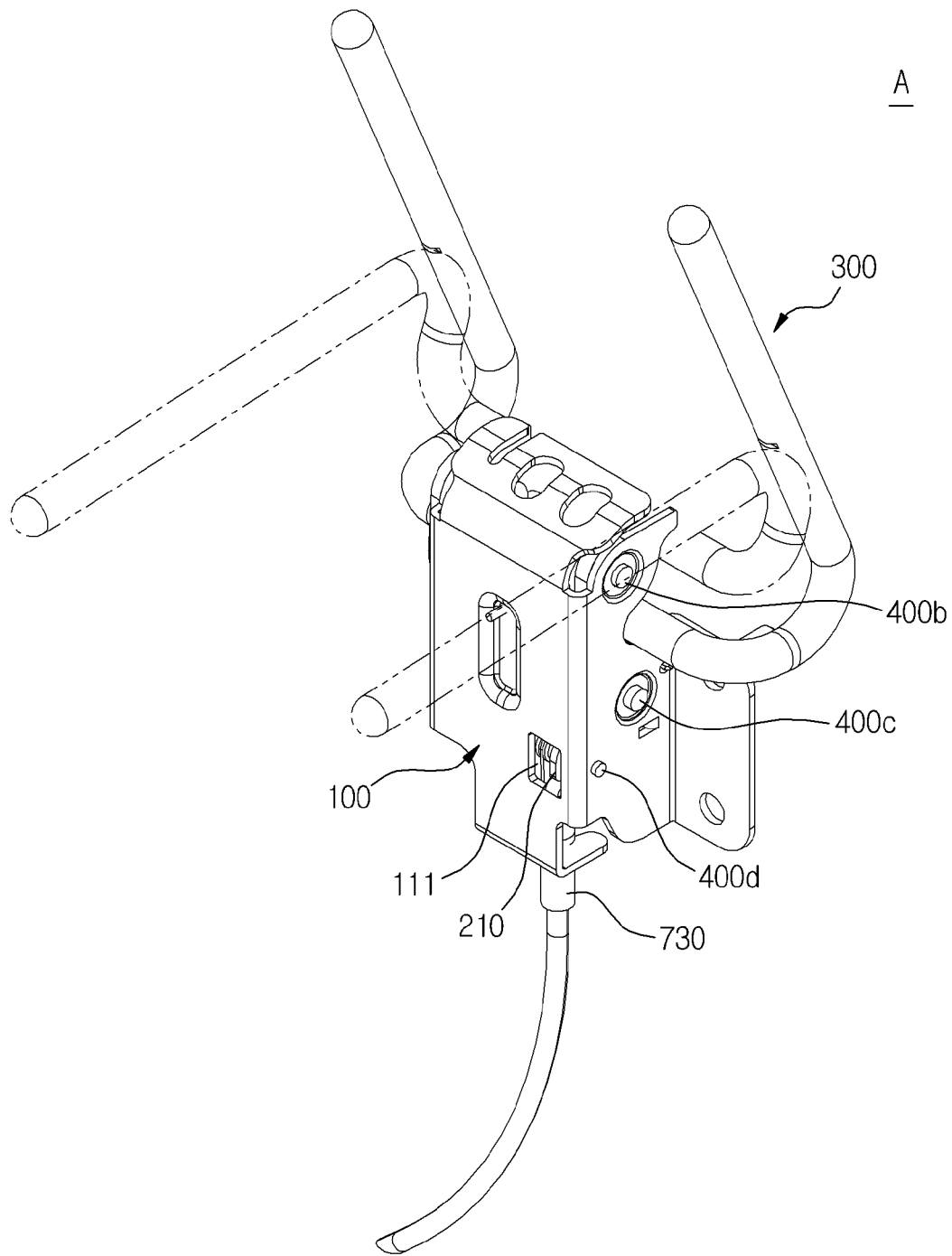

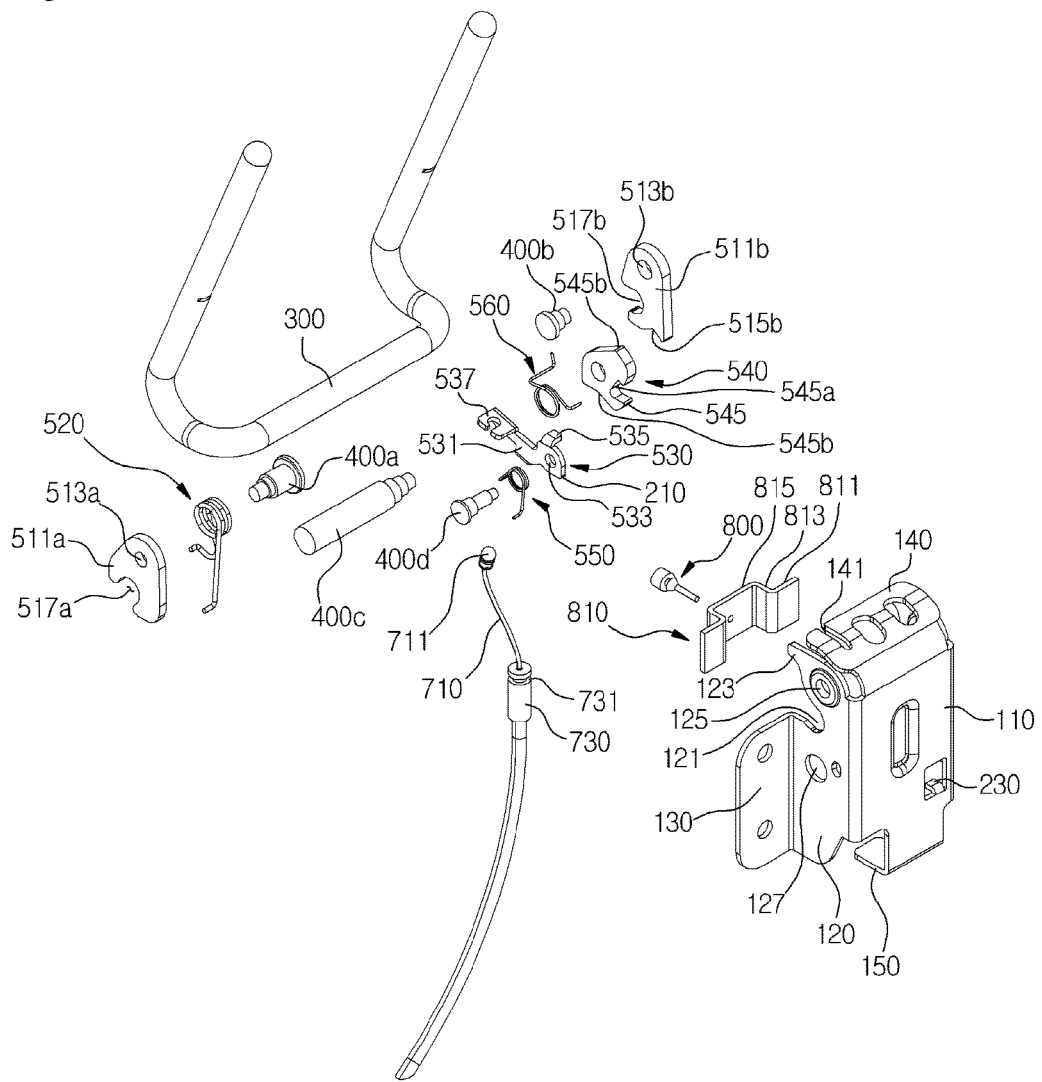
[Fig. 2a]

[Fig. 2b]
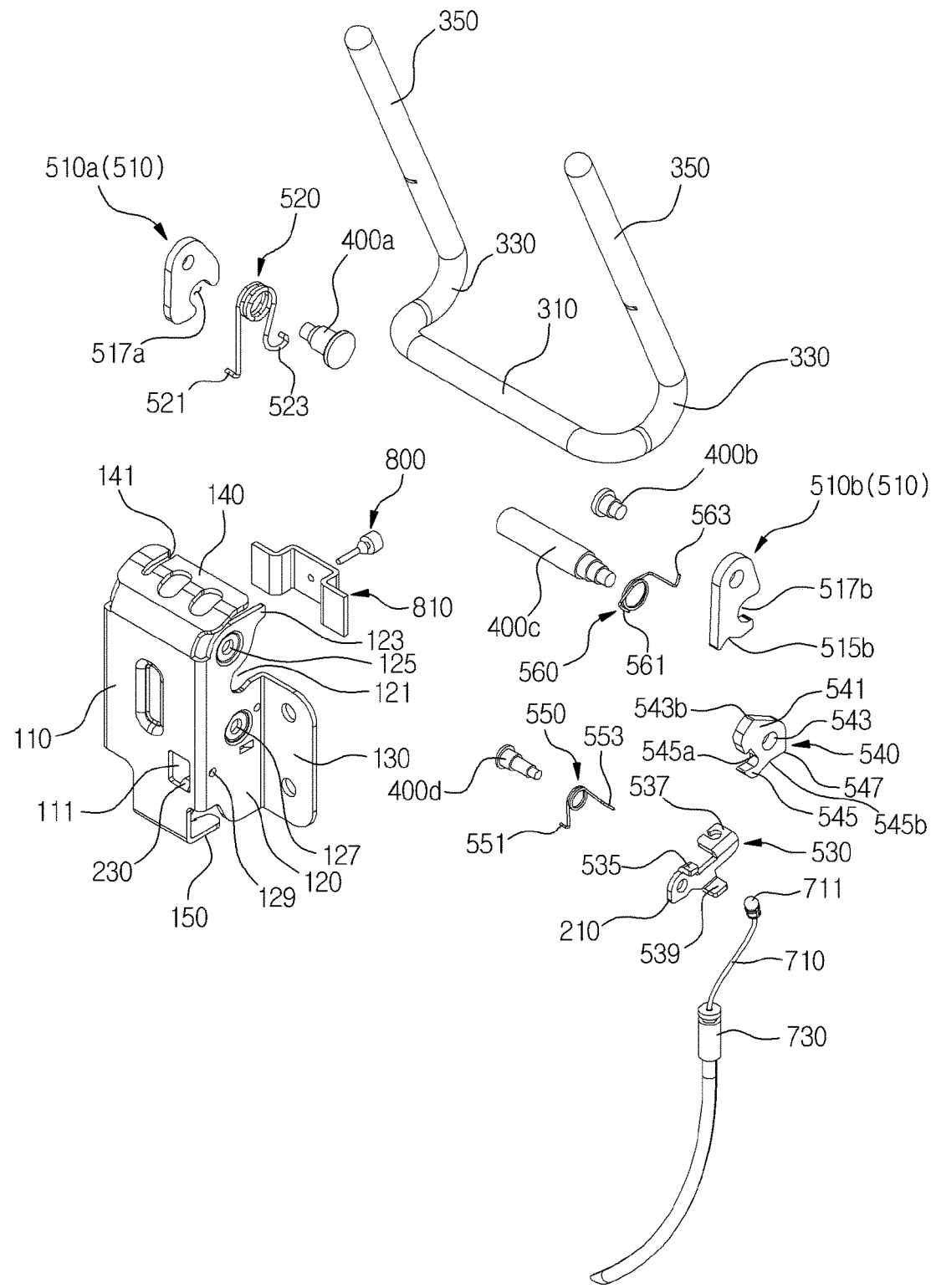

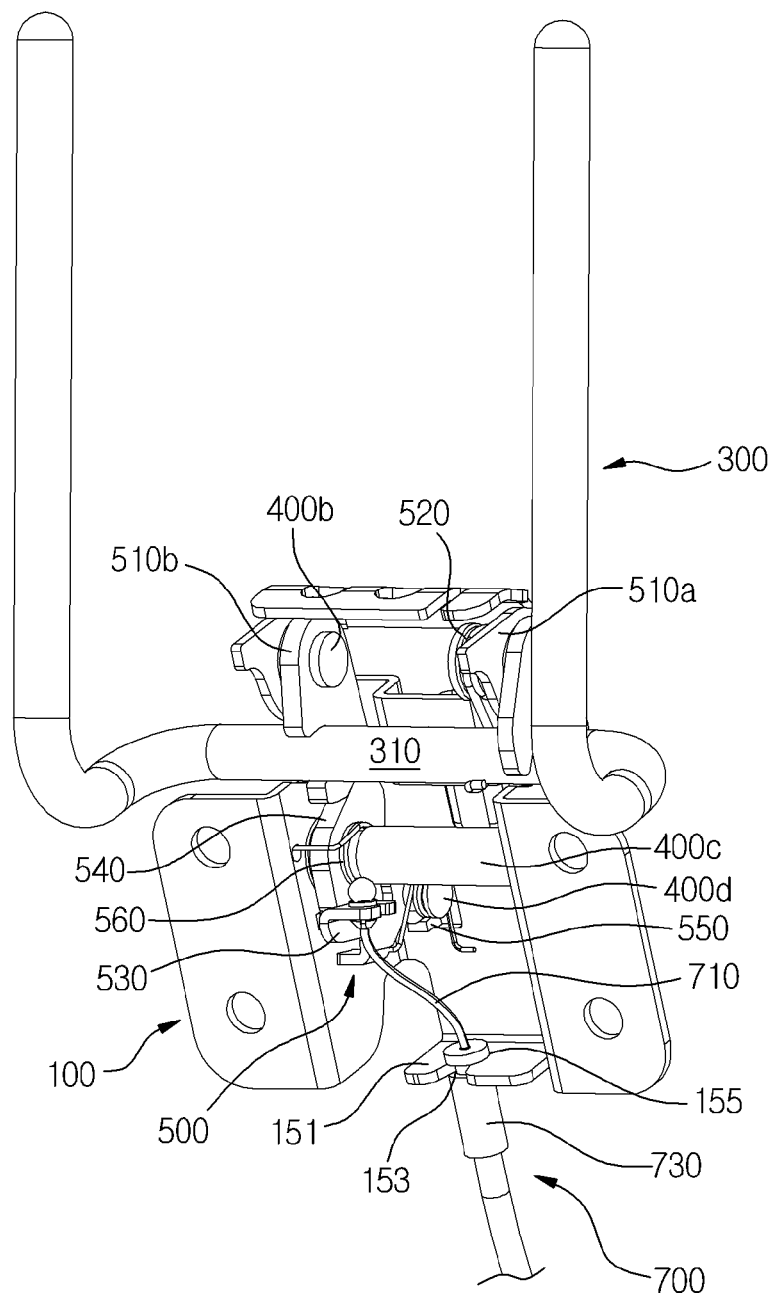
[Fig. 3]

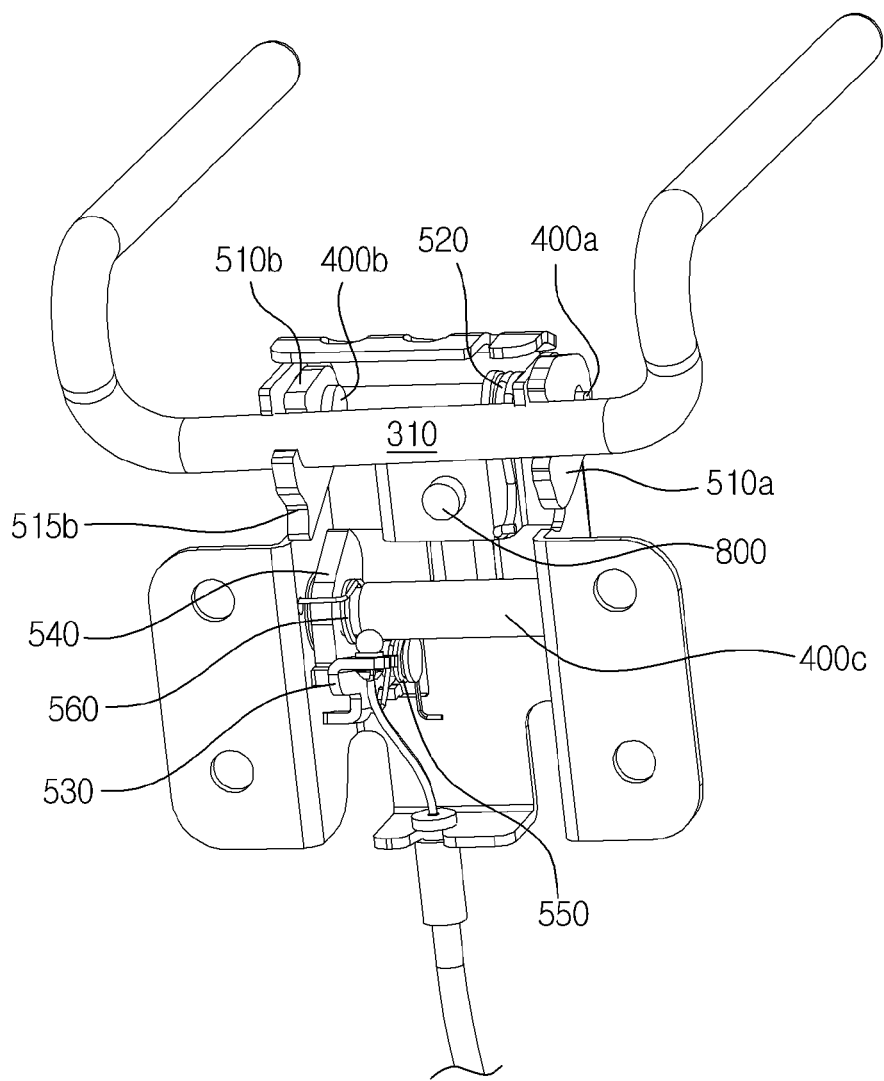
[Fig. 4]

[Fig. 5]
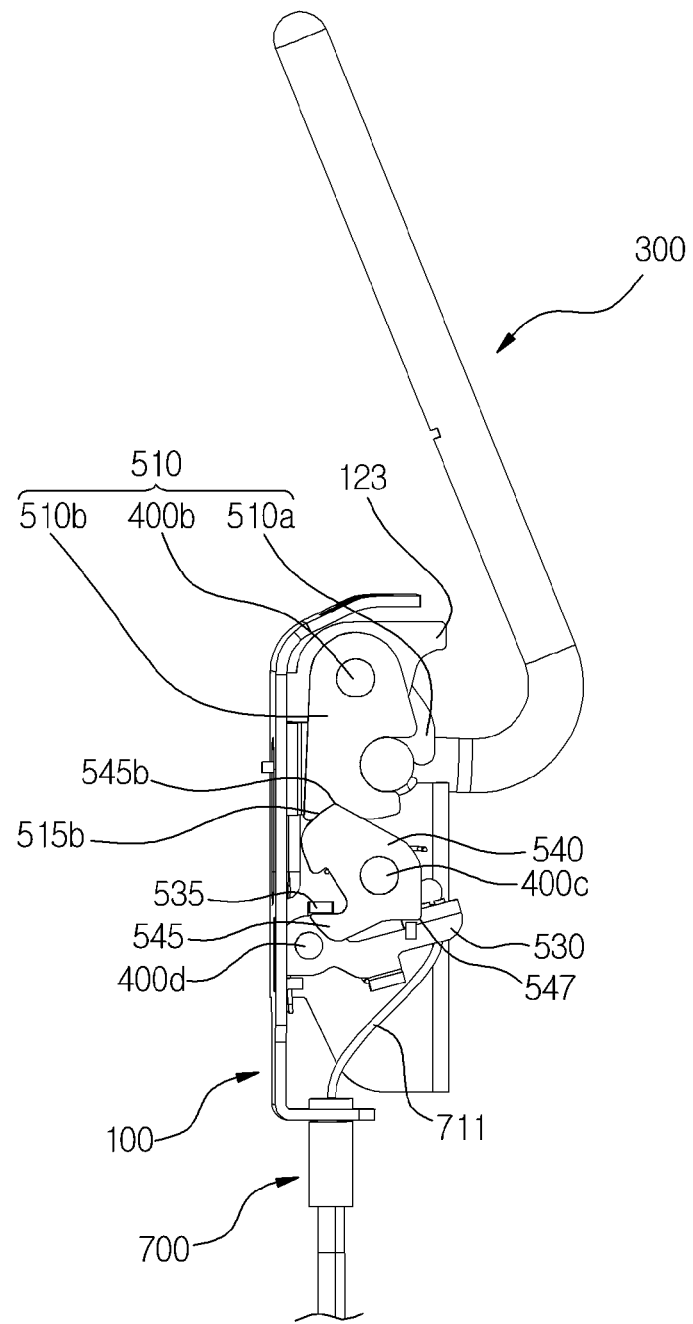

[Fig. 6]
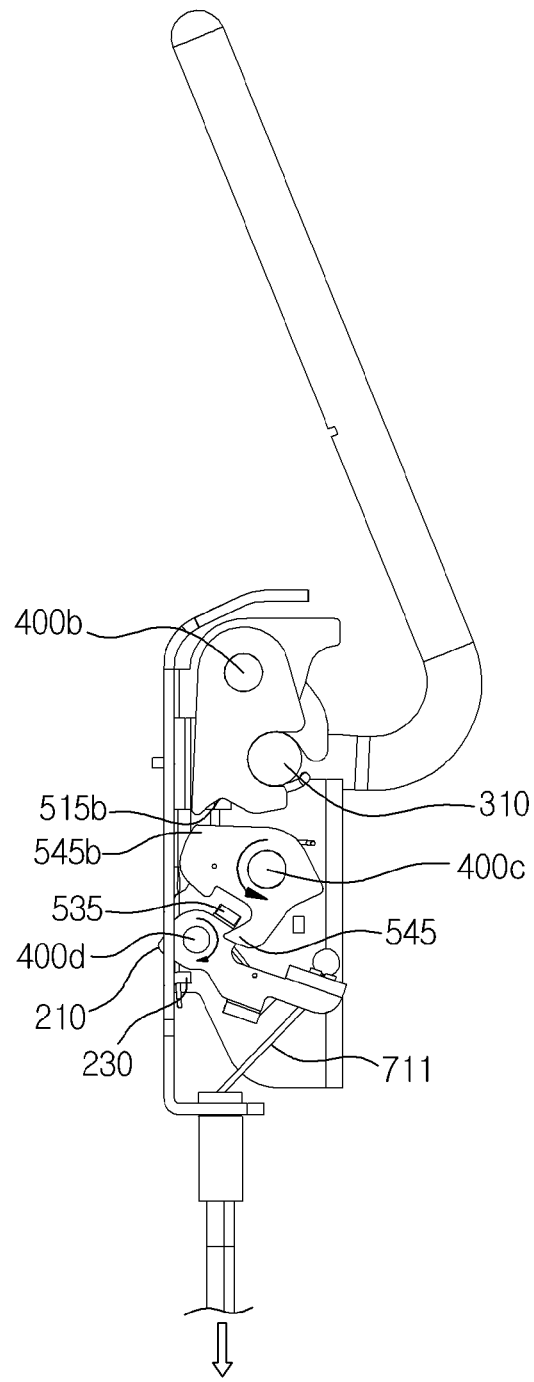

[Fig. 7]
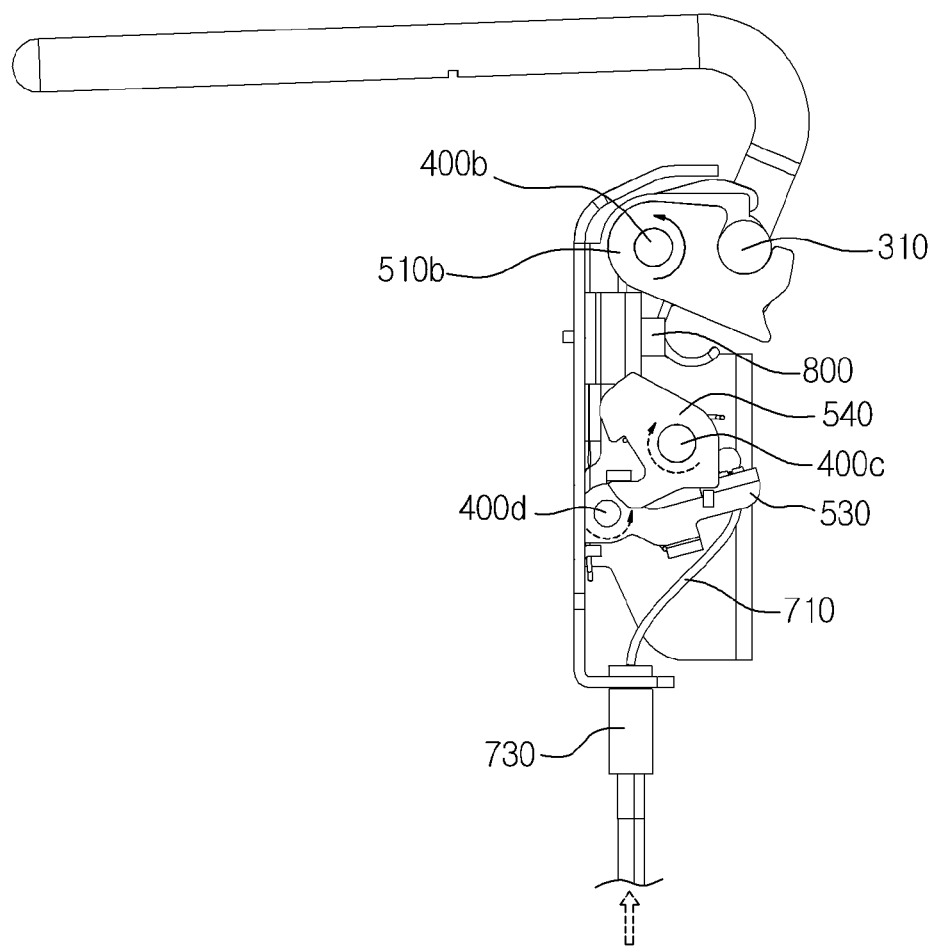

[Fig. 8]
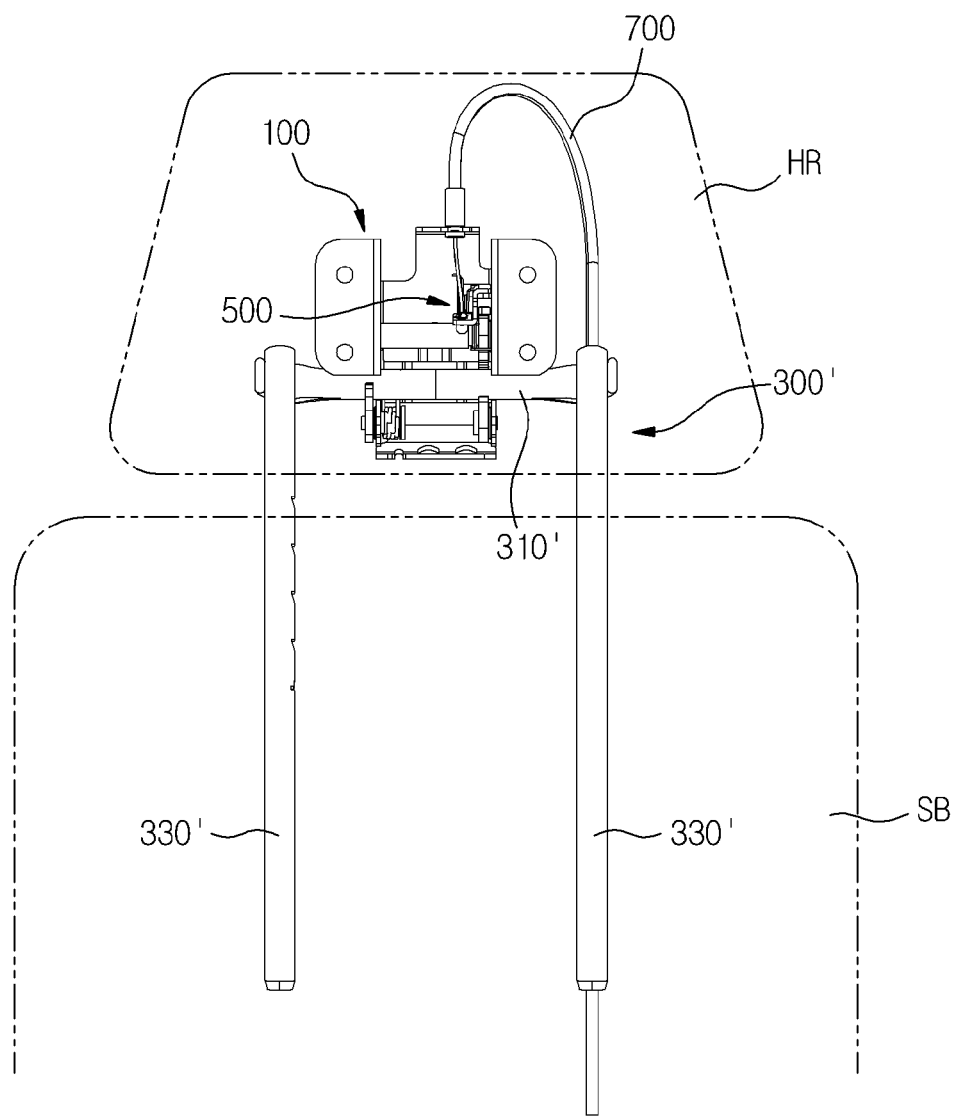

[Fig. 9]
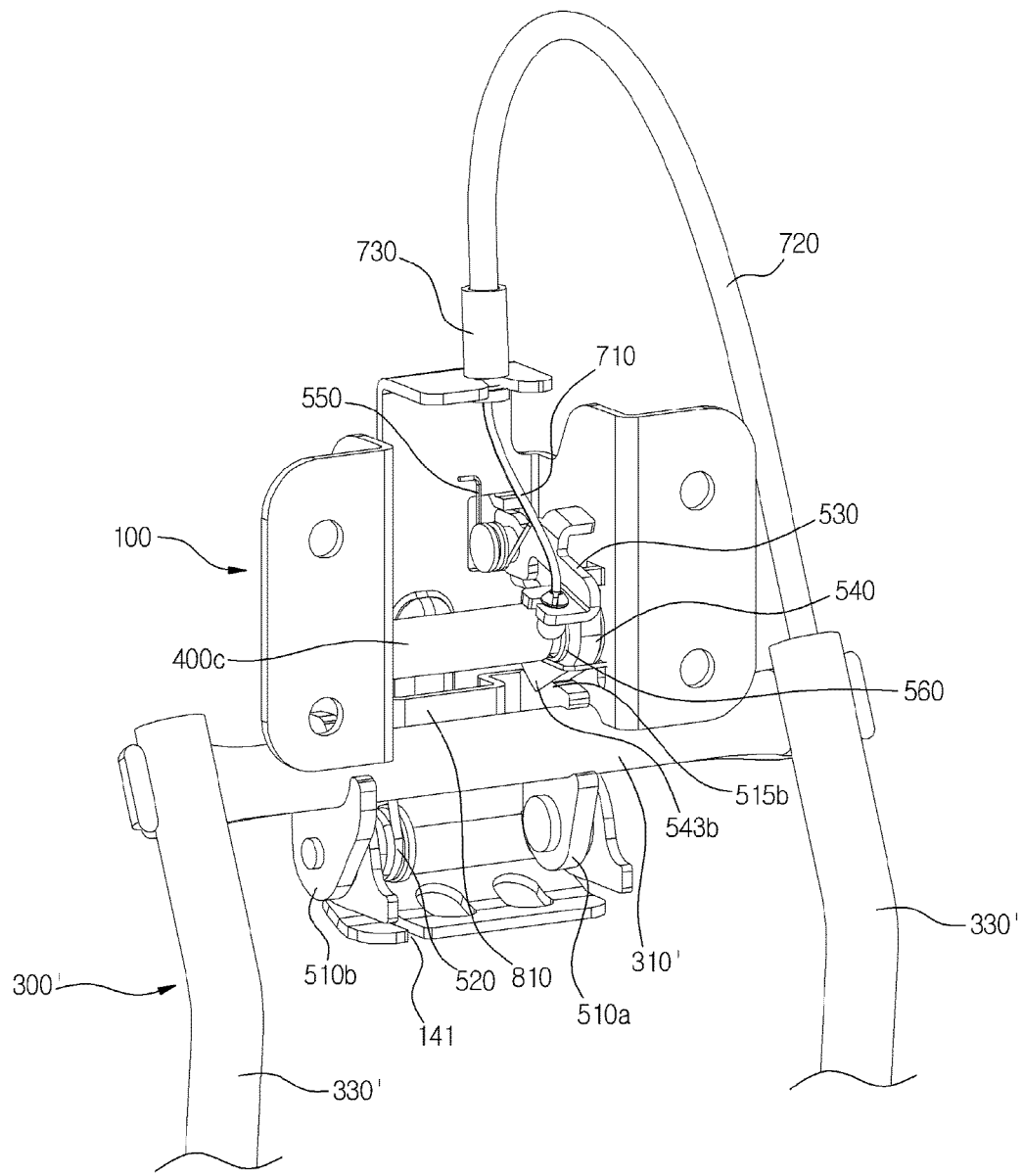

[Fig. 10]
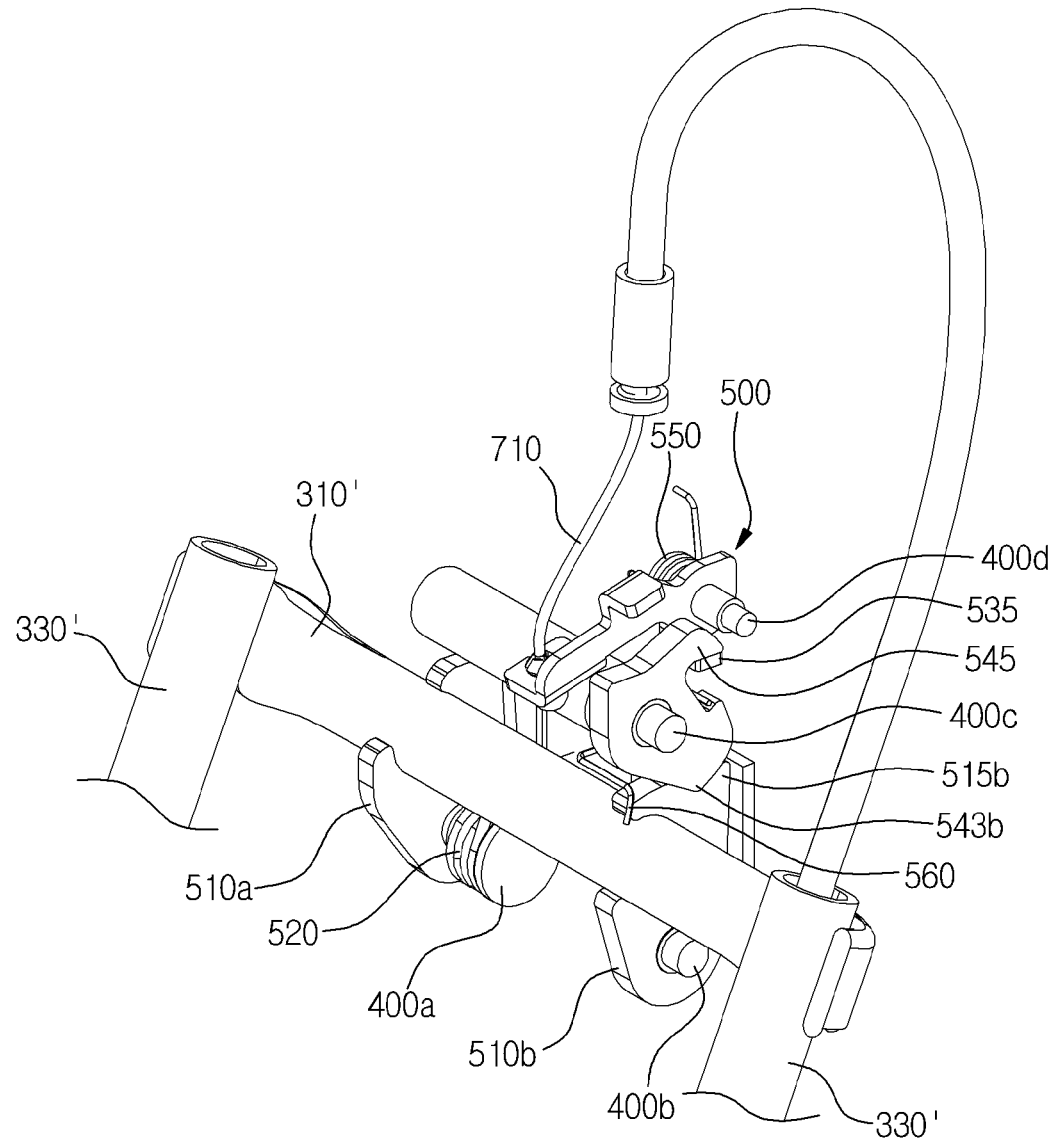

[Fig. 11]
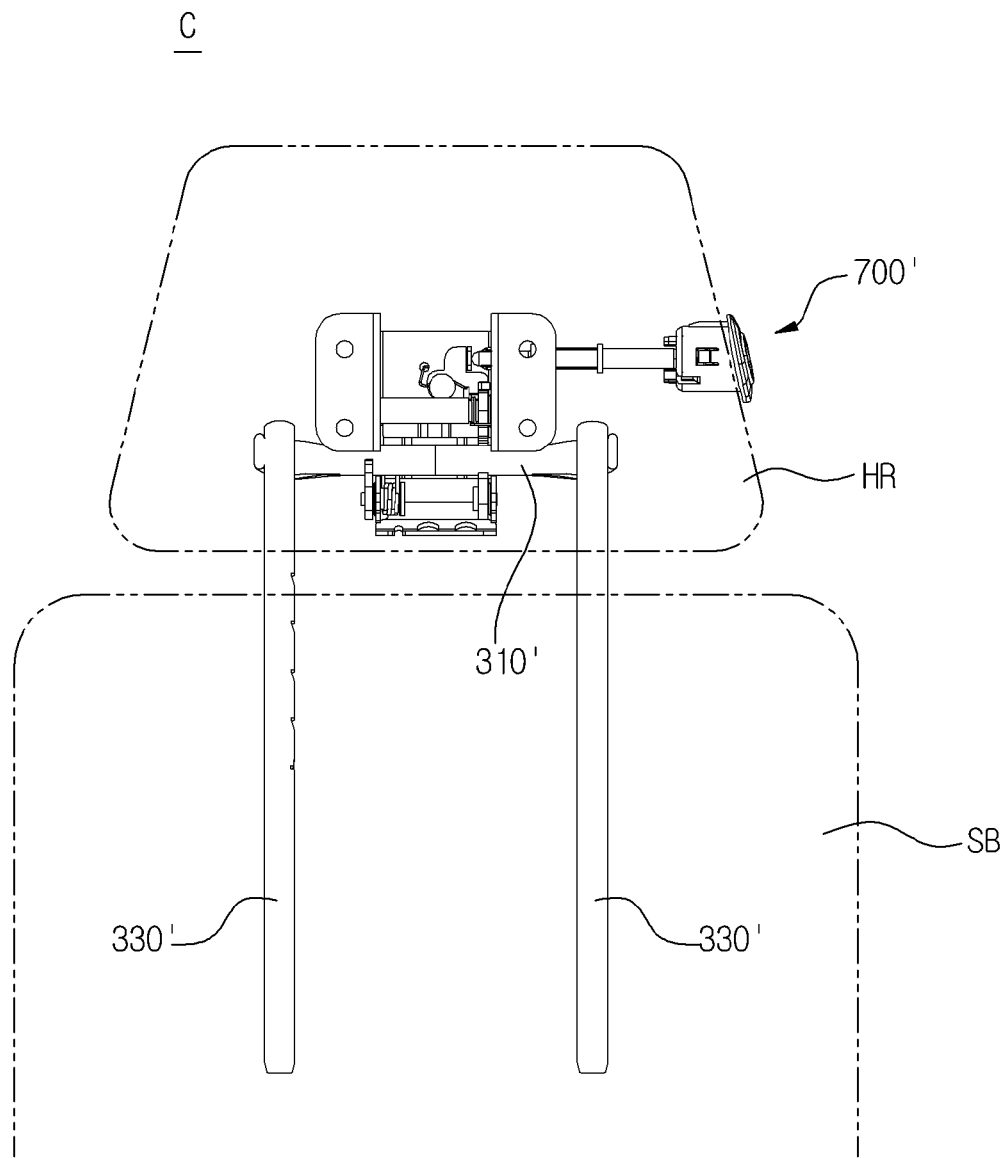

[Fig. 12]
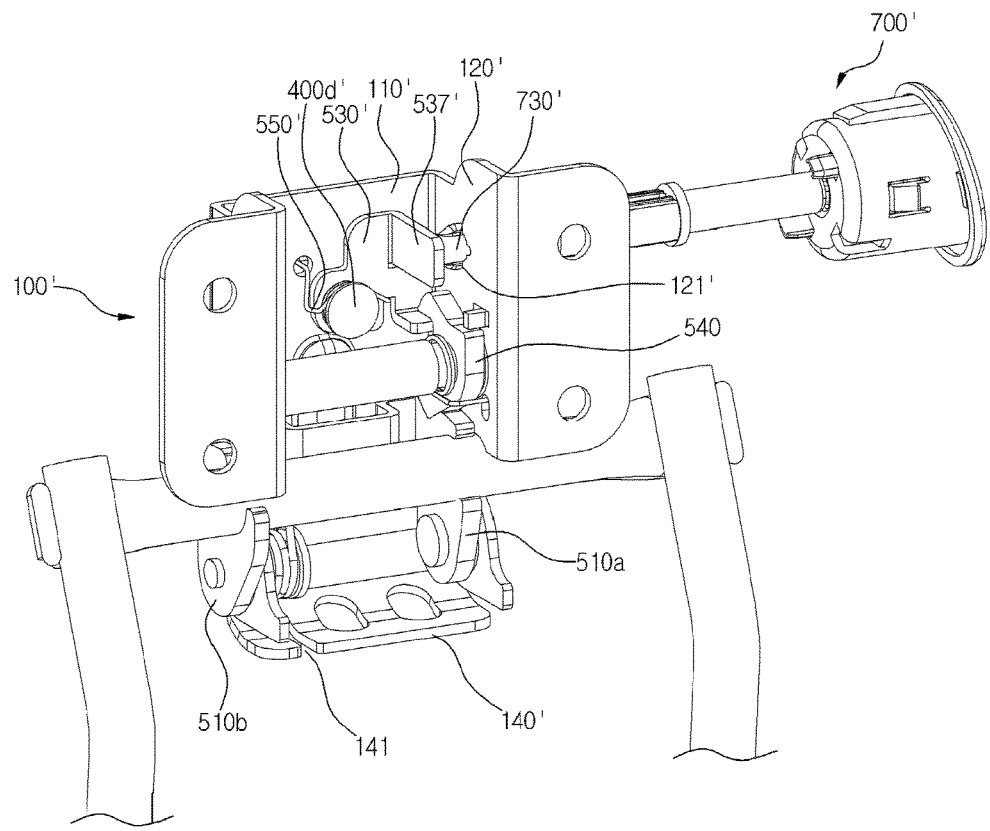
[Fig. 13]
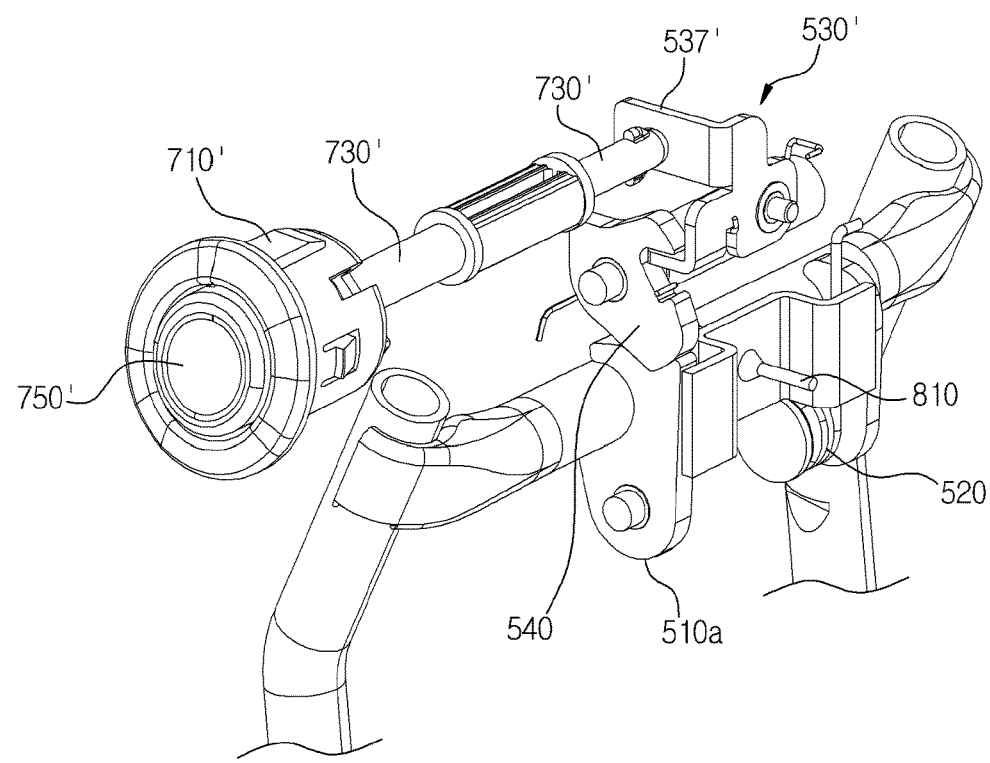

[Fig. 14]
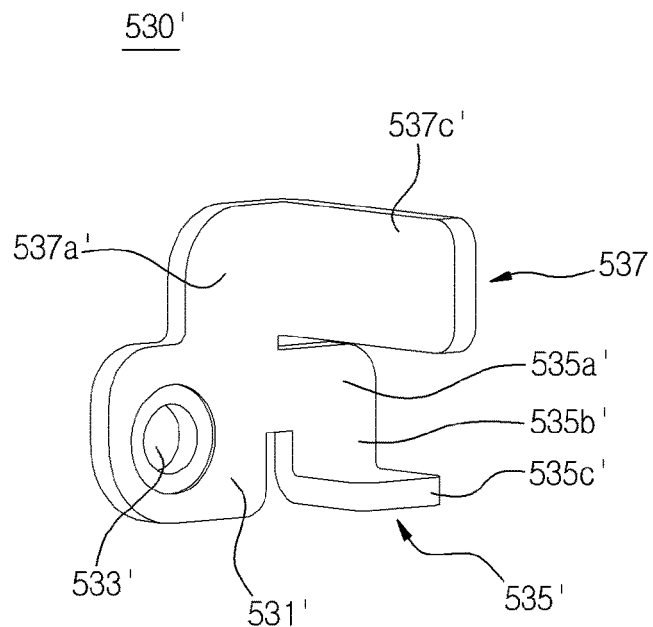
[Fig. 15]
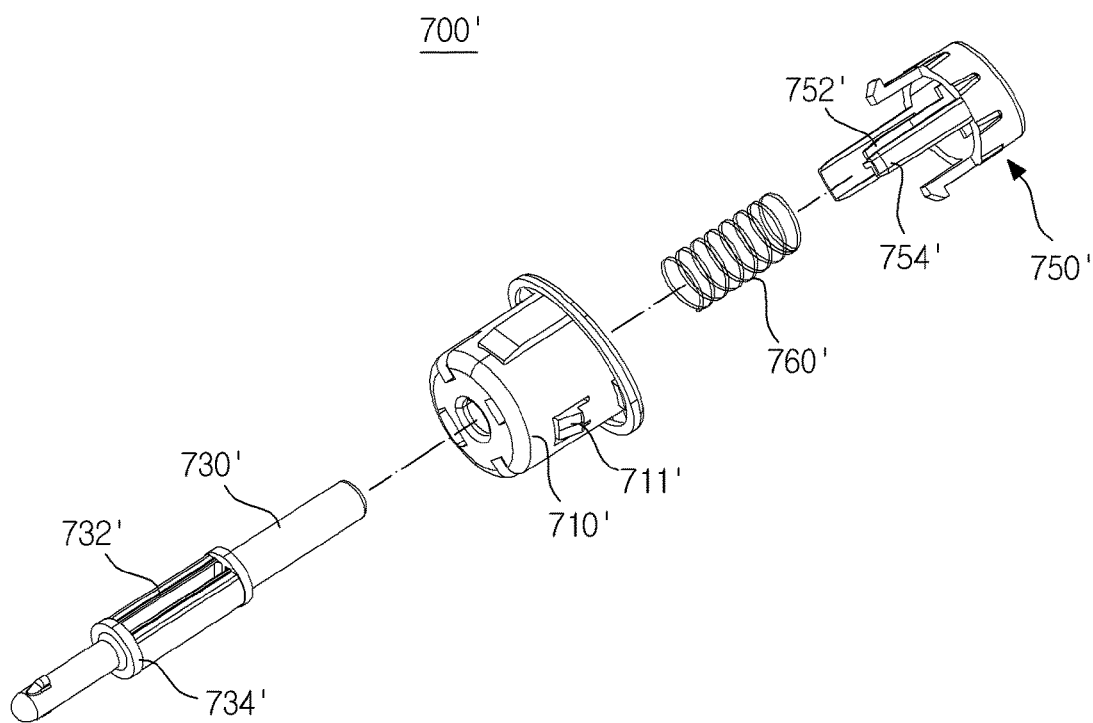

[Fig. 16]
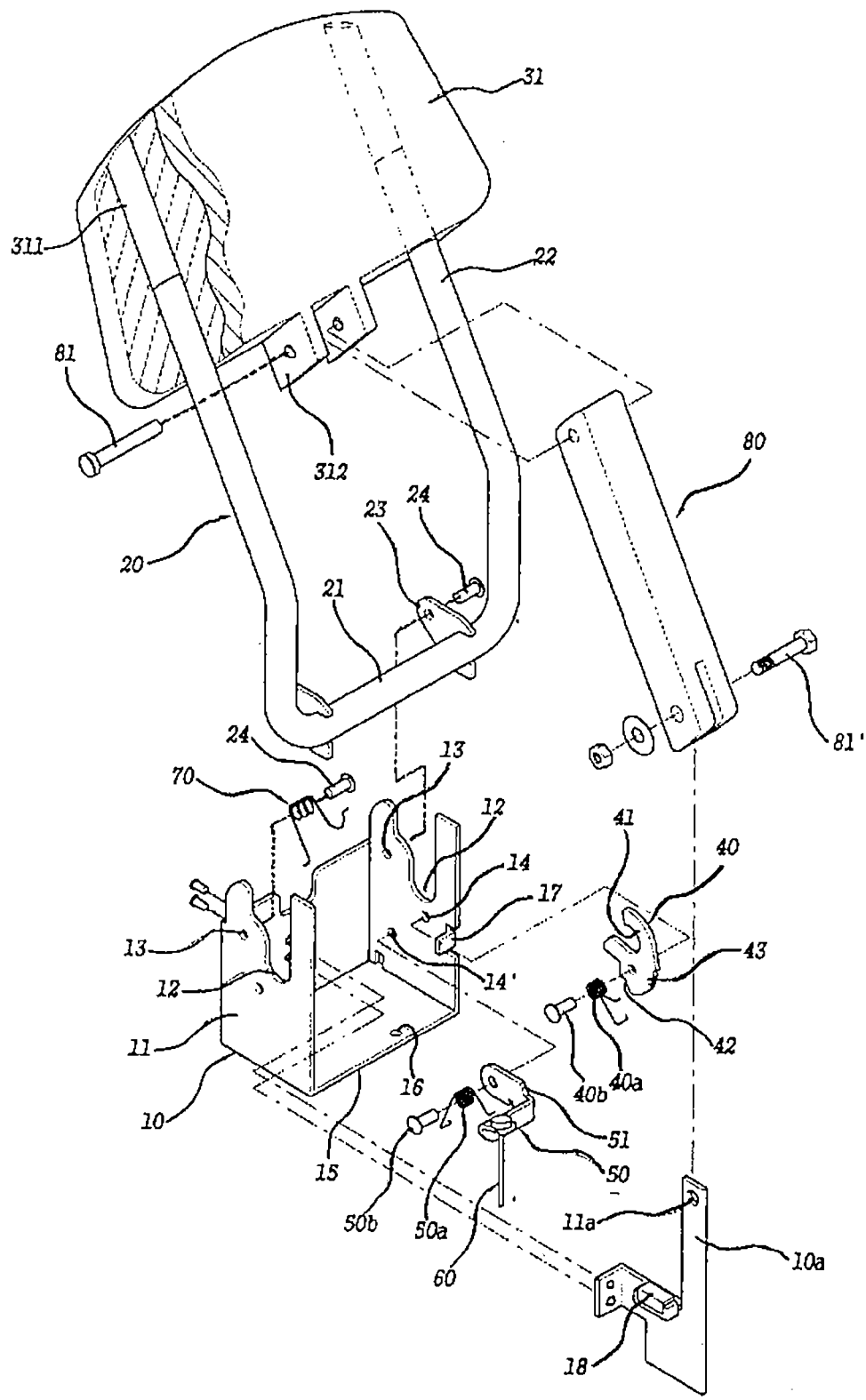

[Fig. 17]
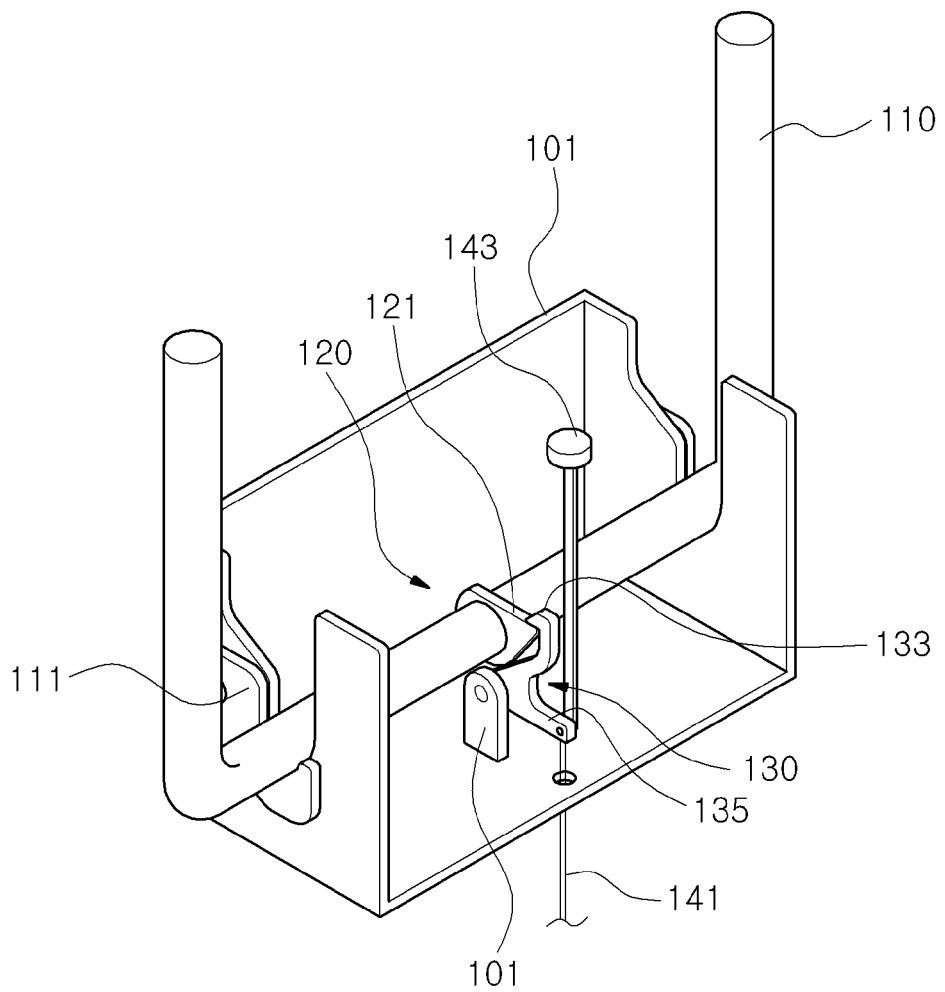

[Fig. 18]
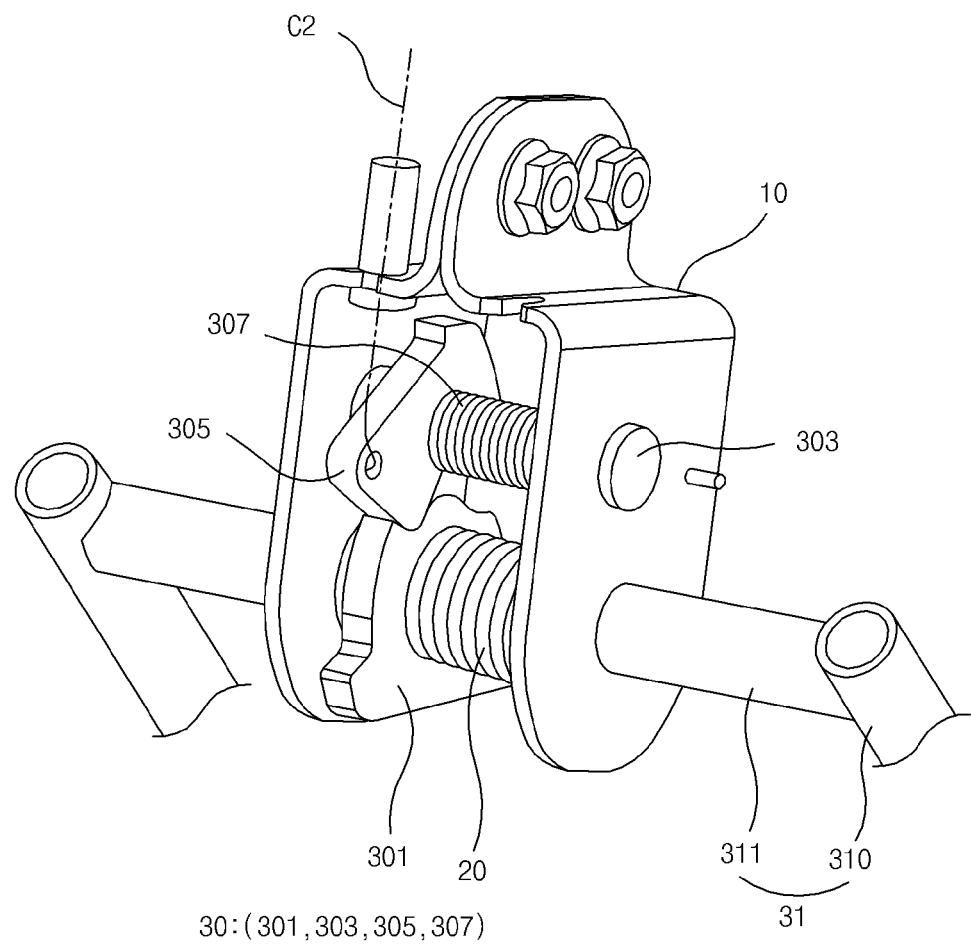

HEADREST FOLDING DEVICE

This application is the national phase entry of international patent application No. PCT/KR2016/011336 filed Oct. 11, 2016 and claims the benefit of Korean patent application No. 10-2015-0162006, filed Nov. 18, 2015, the disclosures of which are incorporated herein by reference in their entirety.

TECHNICAL FIELD

The present invention relates to a headrest folding device, more particularly, to a headrest folding device wherein a ratchet is connected between a release lever and a lock link which maintains the unfolding (upright) of a headrest, so that the operation of the release lever is not directly transferred to the lock link, but rather indirectly transferred to the lock link through the ratchet, thereby smoothing the operation of the release lever.

BACKGROUND ART

A headrest folding device of the prior art has been suggested, for example, as disclosed in the Patent Literature 1 (Korea Registered Patent No. 10-1080313) that had been filed earlier by the applicant of this application.

The headrest folding device of the Patent Literature 1, as illustrated in FIG. 16, comprises: a housing 10 installed inside the back plate of a seat and provided with a pair of guide slots 12 at the same locations in the upper sides of both side plates 11 in a way that the upper portions thereof are open and respectively forming concentric circles with respect to a pair of hinge holes 13; a stay rod 20 whose back ends are fixed to the both sides of a horizontal portion 21 and the front end is pivotally installed to the housing 10 through a pair of hinge plates 23 which are shaft-coupled to the hinge holes 13 via a pair of hinge shafts 24 respectively; a supporting member 30 mounted inside with a supporting plate 31 wherein a pair of guide holes 311 for inserting both front ends of a pair of vertical portions; a holding member 40 which is shaft installed in the inner surface of a side plate 11 via a holding shaft 40b so as to be rotated in the opposite direction of the stay rod 20 due to the repulsive force of a holding spring 40a, and wherein a holding slot 41 is formed in the upper portion for holding the horizontal portion 21 of the stay rod 20 which is erected through upward rotation when the supporting member is being pushed upward, and a holding threshold 42 is formed in the lower end; a stopping member 50 which is shaft installed in the lower side of the inner surface of a side plate 11 with a stopping shaft 50b so as to be rotated in the opposite direction of the holding member 40 due to the repulsive force of a stopping spring 50a, and wherein a stopping threshold 51 is installed in the upper end for maintaining the erected state of the stay rod 20 by holding the holding threshold 42 when the holding member 40 is holding the horizontal portion 21 of the erected stay rod 20; a wire 60 whose one end is coupled to the back end of the stopping member 50 and the other end is installed through coupling with a lever (not shown) which is installed in the outer side of the back plate so that the stopping of the holding member 40 is released by pulling the stopping member 50 and rotating it in the opposite direction of the repulsive force of the stopping spring 50a when the lever is manipulated; a main spring 70 which is coupled to the hinge shaft 24 and one end is hanged on the horizontal portion 21 of the stay rod 20 while the other end is hanged on the other side plate 11 of the housing 10 so that the erected stay rod 20 is forwardly and downwardly rotated and bended due to the reaction of the repulsive force when the stopping of the holding member 40 by the stopping member 50 is released; and a link 80 whose front end is shaft coupled to a hinge plate 4 which is additionally installed in the lower middle of the supporting plate 31 via a line shaft 81 and the back end is shaft coupled to the upper end of a bracket 10a installed in the middle back side of the housing 10 via a line shaft 81' so as to be located in the upper back side than the hinge shaft 24.

The unexplained symbols 14 and 14' represent the shaft holes of the stopping shaft 50b; 17 represents a supporting plate, 16 represents communicating hole of the wire 60; 15 represents a lower surface plate; 11a represents the shaft hole of the line shaft 81'; and 43 represents the supporting threshold.

In such Patent Literature 1, since the horizontal portion 21 of the stay rod 20 is being held in the holding slot 41 of the holding member 40, the force, being applied to the stay rod 20 continuously in the direction of folding, is directly transferred to the holding member 40, therefore the releasing from the holding slot 41 through the rotation of the holding member 40 becomes very stiff.

Such stiff rotation of the holding member 40 directly affects the pulling of the braking member 50, and therefore, a user cannot pull the wire 60 smoothly.

Similarly, in Patent Literature 2 (Korea Registered Patent No. 10-0943327) illustrated in FIG. 17, a hanger portion 120 is disposed in the horizontal portion of the stay rod 110, and a stopper 130 is disposed in the hanger portion 120 whereon the stopping protrusion 131 is caught, therefore the pulling of the stopper 130 is not smooth due to the posture of the stay rod 110 tending to be folded.

In this way, since the braking member or the stopper must directly release the holding of the stay rod in order to switch from the unfolding state to the folding state, therefore a large load is imposed thereon making smooth operation difficult and generating noise too.

Also, since the holding member 40 or the stopper 130 is directly holding the stay, there is limitation in enhancing the strength of the headrest under the state of locking. The shape cannot be changed since the shape of the cross-section of the stay rod is determined to be a circular shape and because of the externally exposed area. Moreover, even the thickness and the size of the stay are changed, it is not practical since the weight and the size will be increased thereby.

Meanwhile, 'tip-up linkage type folding headrest device' of Patent Literature 3 adopts a structure wherein a fixed cam 301 is engaged with a rotating cam 305 as illustrated in FIG. 18.

That is, the fixed cam 301 is not directly locking to the stay 31.

However, when the rotating cam 305 is self-rotating, the stay 31, which is fixed only to the rotating cam 305, is being rotated together.

In such rotation of the stay 31 without a rotation radius of the stay 31, the vertical frame 310 of the stay 31 is pivotally rotated.

The vertical frame 310 is exposed through the slot formed in the upper end of the seat back.

Therefore, since the rotation amount of such pivot type rotation is large, the length of the slot in the seat back along the front to rear direction becomes longer, which is not desirable in the aspects of appearance.

DISCLOSURE OF INVENTION

Technical Problem

An objective of the present invention, devised for solving the above described problems, is to provide a headrest folding device, wherein: the number of components is reduced by locking a component capable of adjusting the rotation radius of the stay and minimizing the externally exposed area; the appearance of the seat back is excellent; and the operating mechanism for folding the headrest can be performed smoothly, yet the strength of the headrest is increased.

Solution to Problem

In order to achieve the above described objective, a headrest folding device of claim 1 described in the present invention comprises: a main bracket mounted in a seat back or a headrest; a stay, mounted in any one of the seat back and the headrest, being rotated with respect to the main bracket so as to be moved between the upright (unfolding) position and the folding position; a lock link whose one end is supported by the main bracket through a first hinge shaft and the other end is fixed to a horizontal bar of the stay; a first twisted coil spring whose one end is supported by the main bracket and the other end is supported by the horizontal bar of the stay; a release lever whose one end is supported by the main bracket through a second hinge shaft; a ratchet which is rotatably supported by the main bracket through a line shaft, and the contact thereof with the lock link is released by the release lever; a second twisted coil spring whose one end is supported by the main bracket and the other end is supported by the release lever; and an operating member whose operating force is applied to the other end of the release lever.

In the headrest folding device of claim 2 described in the present invention, it is preferred that the main bracket comprises: a front plate; a pair of side plates which is formed at the left and the right sides of the front plate and bended backward; a pair of coupling plates, in the side plates, bended towards the left and the right directions respectively; and an upper plate and a lower plate which are respectively formed at the upper and the lower sides of the front plate and bended backward, wherein an open slot disposed before the other end of the first twisted coil spring is pressed is formed in the upper plate.

In the headrest folding device of claim 3 described in the present invention, the lock link comprises: a link plate; a hinge hole formed in the upper side of the link plate; a mountain peak shaped groove formed in the lower end of the link plate; and a rear groove formed in the back side of the link plate and inserted into the horizontal bar, and fixed thereby; and the release lever comprises: a lever main body having a length along the front to rear direction; a rotation hole formed in the front side of the lever main body; a stopping threshold formed in the front side of the lever main body; and a hanger portion formed in the rear side of the lever main body wherein the operating member is hanged, and the ratchet comprises: a ratchet main body wherein a rotation hole is formed; a mountain peak shaped ridge formed in the upper side of the ratchet and being contacted with the mountain peak shaped groove; and a stopping protrusion formed in the lower side of the ratchet main body and held in the stopping threshold.

In the headrest folding device of claim 4 described in the present invention, a stopper protrusion is formed in the front end side of the lever main body; and a slot which forms a space wherein the stopper protrusion can be rotated is formed in the front plate of the main bracket, and a stopper retaining plate wherein the stopper protrusion is held is formed in the lower end of the slot.

In the headrest folding device of claim 5 described in the present invention, a third twisted coil spring whose one end is supported by the main bracket and the other end is supported by the ratchet is further included.

In the headrest folding device of claim 5 described in the present invention, the main bracket is mounted in the headrest, and the stay is mounted in the seat back, and the stay comprises a horizontal bar fixed to the lock link and a pair of vertical pipes installed in both sides of the horizontal bar respectively, wherein the operating member is a wire pulling the other end of the release lever, and the wire is disposed so as to be inserted into and passing through any one of the vertical pipes.

In the headrest folding device of claim 7 described in the present invention, the main bracket is mounted in the headrest, and the stay is mounted in the seat back, and the operating member is a button unit pushing the other end of the release lever.

In the headrest folding device of claim 8 described in the present invention, the lock link comprises: a link plate; a hinge hole formed in the upper side of the link plate; a mountain peak shaped groove formed in the upper end of the link plate; and a rear groove formed in the back side of the link plate and inserted into the horizontal bar, and fixed thereby; and the release lever comprises: a lever main body having a length along the left to right direction; a rotation hole formed in the right side of the lever main body; a stopping threshold formed in the left side of the lever main body; and a pressing plate formed in the left side of the lever main body and being pressed by the button unit, wherein the pressing plate is disposed above the rotation hole, and the stopping threshold is disposed below the rotation hole, and the ratchet comprises: a ratchet main body wherein the rotation hole is formed; a mountain peak shaped ridge formed in the lower side of the ratchet main body and being contacted with the mountain peak shaped groove; and a stopping protrusion formed in the upper side of the ratchet main body and held in the stopping threshold.

In the headrest folding device of claim 9 described in the present invention, it is preferred that a bumper is further installed in the main bracket so as to be in contact with the horizontal bar of the stay when the stay or the main bracket is in the upright position.

Advantageous Effects of Invention

According to a headrest folding device of the present invention, there are following effects.

The lock link which is directly locking the stay is released through the release lever and the ratchet so that the release lever is operated on the ratchet which is indirectly connected to the stay, therefore, a user can softly and smoothly operate the release lever without applying a large force thereto. Furthermore, since the ratchet and the stay are indirectly connected to each other, the strength can be increased through the shape change of the ratchet without changing the shape of the circular cross-section of the stay.

Also, through the engagement of the ratchet with the lock link which is capable of adjusting the rotating radius of the stay, there are effects of a smooth operation due to the indirect locking with the stay, reduction in the externally exposed area of the slot in the seat back through the change of the rotation radius of the stay, reduction in the number of additional components by utilizing the lock link which is an existing component, and the like.

Particularly, due to the mutual reaction of the mountain peak shaped groove of the lock link and the mountain peak shaped ridge of the ratchet, the rotation of the ratchet with respect to the lock link is smoothly performed along the mountain peak shaped inclined surface so that the smooth operation of the release lever is more facilitated, and similarly, positioning of the lock link towards the lock position is performed along the mountain peak shaped inclined surface, and the docking of the lock link is smoothly performed thereby.

Also, an open slot is formed in the main bracket so that the other end of the first twisted coil spring is disposed in the open slot as it is spread, therefore, the assembling becomes very easy when fixing it to the horizontal bar of the stay.

Also, since the length of the release lever from front to rear direction is long, a slot is formed in the front plate of the main bracket so that the stopper protrusion is disposed in the slot, thus a space allowing rotation is secured, so the length of the main bracket from front to rear can be reduced to minimum.

Also, a bumper is disposed in the front plate of the main bracket so that the horizontal bar of the stay is erected as it is contacted with the bumper while the stay is in the upright (unfolding) position, and thus, the shaking of the stay along the front to rear direction is prevented, thereby providing the function of the headrest surely.

BRIEF DESCRIPTION OF DRAWINGS

FIG. 1 is an assembled perspective view illustrating a headrest folding device according to the preferred first exemplary embodiment of the present invention.

FIGS. 2a and 2b are the exploded perspective views of FIG. 1 viewing from the left side and the right side respectively.

FIGS. 3 and 4 are the assembled rear views illustrating the upright (unfolding) position and the folding position of the stay respectively.

FIG. 5 is a side view when the stay is in the upright (unfolding) position.

FIG. 6 is a side view illustrating a state wherein the lock is being released when the pulling member is pulled down.

FIG. 7 is a side view when the stay is in the folding position.

FIGS. 8 and 9 are a rear view and a perspective view respectively illustrating the headrest folding device according to the preferred second exemplary embodiment of the present invention.

FIG. 10 is a perspective view illustrating the essential parts of FIG. 9.

FIGS. 11 and 12 are a rear view and a perspective view respectively illustrating the headrest folding device according to the preferred third exemplary embodiment of the present invention.

FIG. 13 is a perspective view illustrating the essential parts of FIG. 12.

FIG. 14 is a perspective view illustrating the release lever of FIG. 13.

FIG. 15 is an exploded perspective view illustrating the button unit.

FIG. 16 is an exploded perspective view illustrating a headrest folding device of the prior art.

FIG. 17 is a perspective view illustrating another headrest folding device of the prior art.

FIG. 18 is a perspective view illustrating yet another headrest folding device of the prior art.

MODE FOR THE INVENTION

Hereinafter, the preferred exemplary embodiments of the present invention will be described in detail with reference to the accompanying drawings.

For reference, components of the present invention which are same as those of the prior art will not be described in detail separately, but instead, will be referred to the prior art described above.

Embodiment 1: Folding of Stay for Pulling

FIG. 1 is an assembled perspective view illustrating a headrest folding device according to the preferred first exemplary embodiment of the present invention; FIGS. 2a and 2b are the exploded perspective views of FIG. 1 viewing from the left side and the right side respectively; FIGS. 3 and 4 are the assembled rear views illustrating the upright (unfolding) position and the folding position of the stay respectively; FIG. 5 is a side view when the stay is in the upright (unfolding) position; FIG. 6 is a side view illustrating a state wherein the lock is being released when the pulling member is pulled down; and FIG. 7 is a side view when the stay is in the folding position.

As illustrated in FIGS. 1 to 4, a headrest folding device A according to the first exemplary embodiment of the present invention comprises: a main bracket 100 mounted in a seat back; a stay 300, mounted in a headrest, rotated with respect to the main bracket so as to be moved between the upright (unfolding) position and the folding position; a locking mechanism 500 locking the stay 300 to the upright position with respect to the main bracket 100; and a pulling member 700 which is an operating member and operated so as to release the locking state of the locking mechanism 500.

The main bracket 100 comprises: a front plate 110; a pair of side plates 120 formed at the left and right side of the front plate 110 and bended backward; a pair of coupling plates 130 bended outward at the left and right side plates 120 directing towards the left and right direction respectively; and an upper plate 140 and a lower plate 150 respectively formed at the upper and lower side of the front plate and bended backward.

The left and right side of the side plates 120 and the coupling plates 130 are corresponding to each other respectively.

In the upper sides of the left and right side plates 120, a pair of accommodating grooves 121, wherein the horizontal bar 310 of the stay 300 is rotatably (revolvably) accommodated, is formed.

The accommodating grooves 121 are formed with an inclined groove having the path of rotation (revolution) for the horizontal bar 310.

In the upper end of the separation side of the accommodating grooves 121, a pair of stopping thresholds 123 is protrudedly formed wherein the horizontal bar 310 is held so that the horizontal bar 310 is staying in the folded position.

In the upper side of the left and right side plates 120, that is, in the upper side of the accommodating grooves 121, a pair of first hinge holes 125 is formed for supporting the left and right side hinge shafts 400a and 400b, that is, the first hinge shaft which will be described later.

In the lower sides of the left and right side plates 120, that is, in the lower side of the accommodating grooves 121, a pair of line shaft holes 127 is formed for supporting a line shaft 400c which will be described later.

The line shaft 400c is a type of shaft which is supported in the form of a cross traversing the left and right side plates 120.

Meanwhile, in the lower side of the right side plate 120, that is, in the lower side of the line shaft hole 127, a second hinge hole 129 is formed for supporting a right side hinge shaft 400d which is a second hinge shaft to be described later.

Meanwhile, in the upper plate 140, an open slot 141, which is disposed prior to the pressing of the other end 523 of the first twisted coil spring 520, is formed.

Generally, twisted coil spring comprises a twisted coil and the two ends thereof, and usually, the both ends are spread out nearly 180 degrees from each other.

In this spread out state, when they are bended, the both ends become nearly parallel as shown in FIGS. 2a and 2b.

Therefore, while the one end 521 of the first twisted coil spring 520 is fixed to the main bracket 100, the other end 523 is passing through the open slot 141 and disposed in a way that it is upwardly exposed, and this corresponds to an assembly space for bending the other end 523 under the above described state, hanging it on the horizontal bar 310, and supporting it thereby.

A stopping plate 151, wherein the cable alignment rod 730 of the pulling member 700 is held, is formed in the lower plate 150.

The stopping plate 151 is a slot having the shape a letter 'C' when viewed from plan view and comprises an inlet slot 153 and a hanging slot 155 for hanging.

In the outer circumferential surface of the cable alignment rod 730, a groove is formed along the circumference so as to form a small diameter rod 731, and this small diameter rod 731 is inserted into the inlet slot 153 and received inside the hanging slot 155, then the upper and the lower portion having a larger diameter than that of the small diameter rod 731 are held thereby.

On the other hand, a slot 111 being penetrated along the front and rear direction is formed in the front plate 110.

The slot 111 provides a space wherein a stopper protrusion 210, which will be described later, can be rotated.

Preferably, the slot 111 is formed by punching the upper, the left, and the right sides and bending them inward.

At this time, the bended portion is a cantilever shape, and functions as a stopper retaining plate 230 wherein the stopper protrusion 210 is held and retained.

The stay 300 comprises: a horizontal bar 310; a vertical bar 330 extended vertically and backwardly from the both ends of the horizontal bar 310; and an inclined bar 350 slantly and forwardly extended from the vertical bar 330.

The inclined bar 350 has a nearly zero slope angle when the headrest is being folded as shown in FIG. 7.

A headrest cover (not shown) is inserted into the inclined bar 350, and the headrest product comprising the periphery is covered around the headrest cover (not shown).

The locking mechanism 500 comprises: a lock link 510 fixed to the horizontal bar 310 of the stay 300; a first twisted coil spring 520 whose one end 521 is supported by the main bracket 100 and the other end 523 is supported by the horizontal bar 310; a release lever 530; a ratchet 540 interposed between the lock link 510 and the release lever 530; and a second twisted coil spring 550 whose one end 551 is supported by the main bracket 100 and the other end 553 is supported by the release lever 530.

The lock link 510 comprises a pair of left and right side lock links 510a and 510b which is respectively fixed to the both sides of the horizontal bar 310.

The left side lock link 510a comprises: a left side link plate 511a; a left side hinge hole 513a formed in the upper side of the left side link plate 511a; and a left side downward groove 517a formed to face the lower side of the left side link plate 511a and inserted into the horizontal bar 310 and fixed thereto.

The left side hinge hole 513a, as it is inserted with a left side hinge shaft 400a, is supported by a first hinge hole 125 in the left side plate.

The right side lock link 510b comprises: a right side link plate 511b; a right side hinge hole 513b formed in the upper side of the right side link plate 511b; a mountain peak shaped groove 515b; and a right side backward groove 517b formed to face the back side of the right side link plate 511b and inserted into the horizontal bar 310 and fixed thereto.

The right side hinge hole 513b, as it is inserted with a right side hinge shaft 400b, is supported by the first hinge hole 125 in the right side plate.

The first twisted coil spring 520 is a spring applying an elastic force towards the direction for folding the stay 300, at the moment when the lock is released, as shown in FIG. 7, it pushes the stay 300 in the counterclockwise direction so that the lengthwise center of the horizontal bar 310 of the stay is revolved so as to be folded thereby.

One side of the release lever 530 is supported by the right side hinge hole 129 of the main bracket 100 by the second hinge shaft 400d.

That is, the release lever 530 comprises: a lever main body 531 having a length from front to rear direction; a rotation hole 533 formed in front of the lever main body 531; a stopping threshold 535 formed in front of the lever main body 531; and a hanger portion 537 formed in the back side of the lever main body 531, and wherein the pulling member 700 is being held.

The lever main body 531 is formed in the shape of a plate having a length.

The second hinge shaft 400d is inserted into the rotation hole 533, and the second hinge shaft 400d is supported by the right side second hinge hole 129. The second twisted coil spring 550 is inserted into the second hinge shaft 400d.

The stopping threshold 535 is extended towards the right side from the lever main body 531 which is located in the upper side of the rotation hole 533. Thus, the lever main body 531 and the stopping threshold 535 form the shape of an inverted letter 'L.'

The hanger portion 537 in extended towards the left side which is the opposite direction of the stopping threshold 537.

The hanger portion 537 has the shape of letter 'C' when viewed from the plan view similar to the stopping plate 151, and comprises an inlet groove wherein a cable 710 is inserted and a supporting groove which holds the lower end of a ball 711 formed in the upper end of the cable 710 so as to prevent it from slipping downward.

Meanwhile, the stopper protrusion 210 is formed in the front end of the lever main body 531.

That is, the stopper protrusion 210 has the shape of a mountain peak shape protruded from the front side of the circumference of the lever main body 531 wherein the rotation hole 533 is formed.

In addition, as illustrated in FIGS. 1 and 6, the stopper protrusion 210 is disposed in a way that it can be rotated within the space of the slot 111.

Meanwhile, a protrusion 539 protruded outward is formed in the lower right portion of the lever main body 531.

The protrusion 539 plays the role of a supporting plate wherein the other end 553 of the second twisted coil spring 550 is held and supported thereby.

The protrusion 539 is disposed in the location between the stopping threshold 535 and the hanger portion 537.

The second twisted coil spring 550 applies an elastic force so that the pulling member 700 can be returned to its original position (rotated counterclockwise) when it is released after the rear end of the release lever 530 went downward (rotated clockwise) to release the locking.

The second twisted coil spring 550 is preferred to maintain the elastic force so that the rear end of the release lever 530 is positioned slightly higher than the front end thereof.

The ratchet 540 is an intermediate thing which is rotatably supported by the line shaft hole 127 of the main bracket 100 through the line shaft 400c and allows releasing of the contact with the lock link 510 by the operation of the release lever 530.

That is, the ratchet 540 comprises: a ratchet main body 541 wherein a rotation hole 543 is formed; a mountain peak shaped ridge 545b formed in the upper portion of the ratchet main body 541 and contacted with the mountain peak shaped groove 515b; and a stopping protrusion 545 formed in the lower portion of the ratchet main body 541 and held on the stopping threshold 535.

The mountain peak shaped ridge 545b is formed to be like a cam. That is, the vertex of the mountain peak shaped ridge 545b is most far from the center of rotation of the line shaft 400c, and the front slope with respect to the vertex is a slope whose distance from the center of rotation is almost same as it travels downward from the vertex, on the contrary, the rear slope with respect to the vertex is a slope whose distance from the center of rotation is getting shorter as it travels downward from the vertex.

The stopping protrusion 545 is protrudedly formed in the similar shape of a hook.

A groove 545a having the shape of a Korean letter 'ㄷ' (a rectangle without one side) is formed in the circumferential surface of the ratchet main body 541 above the stopping protrusion 545 so that the stopping protrusion 545 can be easily entered beneath the stopping threshold 535.

Also, when the ratchet 540 is in a locked state, it is preferred that a mountain peak shaped protrusion 547 is formed in the lower surface of the rear end portion of the ratchet main body 541 which is the direction opposite to the mountain peak shaped ridge 545b.

The mountain peak shaped protrusion 547 is point contacted to the upper surface of the rear end of the release lever 530.

For such point contact, a seagull shaped groove 545b is formed between the stopping protrusion 545 and the mountain peak shaped protrusion 547 of the ratchet main body 541.

It is desirable that a third twisted coil spring 560 is installed in the ratchet 540 for returning thereof.

One end 561 of the third twisted coil spring 560 is supported by the main bracket 100 and the other end 563 thereof is supported by the ratchet main body 541.

The first twisted coil spring 520 maintains the compressed state and expands when the locking is released, on the contrary, the second and the third twisted coil springs 550 and 560 are in the spread state initially and being compressed when an external force is applied, and thus an elastic force is provided so as to be returned to the original position when the external force is removed.

The pulling member 700 is a cable assembly, as described above, and comprises a cable 710 and an alignment rod 730 which aligns the cable 710.

Thus, when a user pulls the lever located in the side of the seat, the cable 710 is pulled down and the release lever 530 releases the locking.

On the other hand, it is preferred that a bumper 800 is further installed in the main bracket 100.

That is, as illustrated in FIGS. 2a, 2b and 3, the bumper 800 is installed in a bumper bracket 810 which is fixed to the inner surface of the front plate 110 of the main bracket 100.

The bumper bracket 810 comprises:

a pair (left and right) of plates 811 being fixed to the internal surface of the front plate 110;

a pair of back plates 813 extended backward from the plates 811; and a connecting plate 815 connecting the left and the right back plates 813.

Thus, a space having the length of the back plates 813 between the inner surface of the front plate 110 and the connecting plate 815.

The bumper 800 is installed in the connecting plate 815.

Owing to such configuration with the bumper 800, the bumper 800 is in contact with the horizontal bar 310 of the stay 300 in the upright position, and thus the shaking of stay 300 is prevented.

Hereinafter, the operation of the configuration according to the previously described first exemplary embodiment of the present invention will be described with reference to FIGS. 5 to 7.

The locking mechanism 500 wherein the stay 300 is being locked (upright position) is illustrated in FIG. 5.

That is, the mountain peak shaped groove 545b of the lock link 510 and the mountain peak shaped ridge 515b of the ratchet 540 are maintaining the contact state as they are docking to each other.

In addition, the back end of the release lever 530 is slantly disposed in a posture so that the ratchet 540 is being pushed up along the diagonal direction.

In the state of FIG. 5, when the pulling member 700 is pulled down, the stopping protrusion 545 of the ratchet 540 is pulled down by the stopping threshold 535 as the release lever 530 is rotated clockwise through the second hinge shaft 400d as shown in FIG. 6.

Then, the ratchet 540 is rotated counterclockwise with respect to the line shaft 400c by the stopping protrusion 545.

Due to the counterclockwise rotation of the ratchet 540, the mountain peak shaped ridge 545b is separated from the mountain peak shaped groove 515b.

When the mountain peak shaped ridge 545b is separated from the mountain peak shaped groove 515b, the stay 300 is rotated (revolved) with respect to the first hinge shafts 400a and 400b by the first twisted coil spring 520, and goes to the folded position thereby.

That is, the stay 300 is being revolved with a varying center of rotation of the horizontal bar 310 thereof.

Such variation in the center of rotation reduces the left to right range when the stay 300 is folded, and the size of the slot formed in the upper end of the seat back is reduced thereby, thus it is very desirable in the aspects of appearance.

On the contrary to the above described case, when the pulling of the pulling member 700 is released just after the mountain peak shaped ridge 545b is separated from the mountain peak shaped groove 515b, as shown in FIG. 7, the release lever 530 is rotated counterclockwise by the second twisted coil spring 550 through the second hinge shaft 400d, and at the same time, the ratchet 540 is rotated clockwise by the third twisted coil spring 560 through the line shaft 400c, and an effect is generated that pulls up the stopping protrusion 545 of the ratchet 540 above the stopping threshold 535.

In this way, at the state wherein the locking is released and the stay 300 is folded as shown in FIG. 7, if a user push up the stay 300 towards the back side in order to be in the upright state as shown in FIG. 5 again, the lock link 510 is rotated clockwise with respect to the first hinge shafts 400a and 400b, and then the mountain peak shaped groove 515b is held on the mountain peak shaped ridge 545b, and the docking is completed thereby.

Of course, in the state wherein the docking is completed, the shaking is prevented since the horizontal bar 310 is in contact with the bumper 800 and the pressure therebetween is being maintained.

Embodiment 2: Folding of Main Bracket for Pulling

FIGS. 8 and 9 are a rear view and a perspective view respectively illustrating the headrest folding device according to the preferred second exemplary embodiment of the present invention, and FIG. 10 is a perspective view illustrating the essential parts of FIG. 9.

The configuration of the headrest folding device B according to the second exemplary embodiment is almost same as that of the headrest folding device according to the first exemplary embodiment except that a main bracket 100 is mounted in the headrest HR, and a stay 300' is mounted in the seat back SB.

That is, the headrest folding device B according to the second exemplary embodiment is same as the headrest folding device according to the first exemplary embodiment A with flipped upside down.

Due to the flipped upside down configuration, the main bracket 100 is located in the upper side, therefore the pulling member 700 is also located in the upper side.

In order to guide such pulling member 700 downward, a pair of vertical pipes 330' extended downward at the left and right end of a horizontal bar 310' of the stay 300' is fixed thereto.

A cable 720 with a wire 710 is passing through one of these left and right vertical pipes 330' from the top to the bottom.

Hereinafter, the operation of the configuration according to the previously described second exemplary embodiment of the present invention will be described with reference to FIGS. 9 to 10.

The locking mechanism 500 wherein the main bracket 100 is in a locking (upright) state is illustrated in FIGS. 9 and 10.

That is, a mountain peak shaped groove 515b of the lock link 510 and a mountain peak shaped ridge 543b of the ratchet 540 are maintaining the contact state as they are docked to each other.

In addition, the back end of the release lever 530 is slantly disposed so that the ratchet 540 is being pushed up along the diagonal direction.

In the state of FIGS. 9 and 10, when the pulling member 700 is pulled down, the stopping protrusion 545 of the ratchet 540 is pulled up by the stopping threshold 535 as the release lever 530 is rotated clockwise and upwardly through the second hinge shaft 400d.

Then, the ratchet 540 is rotated counterclockwise with respect to the line shaft 400c by the stopping protrusion 545.

Due to the counterclockwise rotation of the ratchet 540, the mountain peak shaped ridge 545b is separated from the mountain peak shaped groove 515b.

When the mountain peak shaped ridge 545b is separated from the mountain peak shaped groove 515b, the main bracket 100 is being folded forward by the first twisted coil spring 520.

Of course, when the pulling of the pulling member 700 is released just after the mountain peak shaped ridge 545b is separated from the mountain peak shaped groove 515b, the release lever 530 is rotated counterclockwise by the second twisted coil spring 550 through the second hinge shaft 400d, and at the same time, the ratchet 540 is rotated clockwise by the third twisted coil spring 560 through the line shaft 400c, and an effect is generated that pushes down the stopping protrusion 545 of the ratchet 540 above the stopping threshold 535.

In this way, at the state wherein the locking is released and the main bracket 100 is being folded forward, if a user pushes up the stay 300 backward in order to be in the upright state as shown in FIGS. 8 and 9 again, the lock link 510 is being rotated clockwise with respect to the first hinge shafts 400a and 400b, and then the mountain peak shaped groove 515b is held on the mountain peak shaped ridge 545b, and the docking is completed thereby.

Of course, in the state wherein the docking is completed, the shaking is prevented since the horizontal bar 310' is in contact with the bumper 800 and the pressure therebetween is being maintained.

Embodiment 3: Folding of Main Bracket for Button

FIGS. 11 and 12 are a rear view and a perspective view respectively illustrating the headrest folding device according to the preferred third exemplary embodiment of the present invention; FIG. 13 is a perspective view illustrating the essential parts of FIG. 12; FIG. 14 is a perspective view illustrating the release lever of FIG. 13; and FIG. 15 is an exploded perspective view illustrating the button unit.

The configuration of the headrest folding device C according to the third exemplary embodiment is almost same as that of the headrest folding device according to the second exemplary embodiment B, however, there is a difference in that the operating member 700 of a release lever 530' is implemented by a button unit 700'.

In addition, for the detailed structure and description of the button unit 700', refer to Korea Registered Patent No. 10-1428664 that had been filed earlier by the applicant of this application.

That is, the release lever 530' is rotatably supported at the front plate 110 of a main bracket 100' through a second hinge shaft 400d'.

Thus, the one end of a second twist coil spring 550' is supported at the release lever 530' and the other end is supported by a front plate 110.

As illustrated in FIG. 14, the release lever 530' comprises: a lever main body 531' having a length along the front to rear direction; a rotation hole 533' formed in the right side of the lever main body 531'; a lower stopping threshold 535' formed in the left side of the lever main body 531'; and an upper pressing plate 537' formed in the left side of the lever main body 531' and being pressed by a button unit 700'.

The pressing plate 537' is disposed above of the rotation hole 533', and the stopping threshold 535' is disposed below the rotation hole 533'.

The lower stopping threshold 535' in the lower side comprises: a right side extension 535a' extended rightward from the lever main body 531'; a lower side extension 535b' extended downward from the right side extension 535a'; and a bended stopping threshold 535c' formed by bending the lower end of the lower side extension 535b' towards the back side direction.

The bended stopping threshold 535c' is bended almost in parallel with a lower plate 140'.

The bended stopping threshold 535c' practically plays the role of the lower stopping threshold 535'.

The upper pressing plate 537' comprises: an upper extension 537a' extended upward from the lever main body 531'; and a bended pressing plate 537c' formed by bending the right side of the upper extension 537a' towards the back side direction.

The bended pressing plate 537c' is bended in parallel with a side plate 120' of the main bracket 100'.

The bended pressing plate 537c' practically plays the role of the upper pressing plate 537'.

A button unit through-hole 121' is formed in the side plate 120'.

The button unit 700' is inserted into the button unit through-hole 121' and slidingly installed in the main bracket 100'. The button unit 700' is horizontally disposed along the left to right direction. In this way, a user can manipulate the button unit 700' easily.

As illustrated in FIG. 15, the button unit 700' comprises: a mounting portion 710' having the shape of a cylinder and installed in the side portion of the headrest; a button 750' slidingly installed inside the mounting portion 710'; a button return spring 760' disposed between the mounting portion 710' and the button 750' for returning the button 750'; and a transfer rod 730' pressing the upper pressing plate 537' through transferring the pressing force of the button 750'.

The mounting portion 710' is formed in a way that one side thereof is open while the other side thereof is closed.

A portion of the outer circumferential surface of the mounting portion 710' is cut off for forming connecting hooks 711' therein. Due to such connecting hooks 711' the mounting portion 710' can be installed in the headrest through insertion at one time.

A button rod through-hole and a spring support base through-hole are formed in the other side of the mounting portion 710'.

A first spring support base surrounding the spring support base through-hole is formed in another side of the mounting portion 710'.

The first spring support base is inserted into the other end of the button return spring 760' which is provided as a coil spring.

The button 750' is formed in the shape of a cylinder whose one side is closed while the other side is open.

The button 750' is formed in a way that a second spring support base 752', which is inserted into the one side of the button return spring 760', is protrudedly formed in the center facing the other side thereof.

The second spring support base 752' delivers pressing force to the transfer rod 730' through the spring support base through-hole.

A button rod 754' is protrudedly formed in the other end of the button 750'.

The button rod 754' may be formed plurally, and a hook protrusion is formed at least one of the plurality of button rods 754'.

Such button rod 754' is penetrating through the button rod through-hole.

Due to the button rod 754', the button 750' is slidingly installed to the mounting portion 710', and at the same time the sliding motion of the button 750' is guided.

In the circumferential surface of the button 750', a protrusion whose thickness is getting thicker as it travels towards the other side is formed along the sliding direction.

The transfer rod 730' is formed in the shape of a rod, and the outer diameter of the one side is larger than that of the other side thereof, and the middle portion between the one side and the other side is formed to have a larger diameter than the one side.

A middle portion 732' of the transfer rod 730' is formed to have a flat upper portion and a flat lower portion, and a through-hole is formed in the center thereof along the length direction.

The middle portion 732' of the transfer rod 730' is inserted into the button unit through-hole 121' of the side plate 120'.

A pair of stopping thresholds 734' is formed at both sides of the middle portion 732' of the transfer rod 730', and stopped by the button unit through-hole 121' of the side plate 120'. Owing to this configuration, the transfer rod 730' is not separated from the side plate 120'.

Hereinafter, the operation of the third exemplary embodiment having the above described configuration.

When a user pushes the button 750' disposed in the headrest, the transfer rod 730' is pressed, and the pressing plate 537' of the release lever 530' is pressed. Thus, the release lever 530' is upwardly rotated with respect to the second hinge shaft 400d as a center of rotation. Due to this action, the ratchet 540 is also upwardly rotated, and the docking with the lock link 510 is released thereby, and the main bracket 100' is folded forward by the first twisted coil spring 520.

When the force pressing the button 750' is removed, the release lever 530' is reversely rotated and returned by the second twisted coil spring 550' which is a return spring.

The ratchet 540 is also returned as the release lever 530' is returned, and geared with the lock link 510 through docking.

As described above, although the present invention has been described with reference to the preferred exemplary embodiments, various changes and alterations of the present invention can be made by those skilled in the art without departing from the spirit and the scope of the present invention written in the claims described herein below.

For example, although in this exemplary embodiment, it is described and illustrated that the main bracket is mounted in the seat back and the stay is mounted in the headrest, it will be apparent for a person skilled in the art that, on the contrary, the main bracket is mounted in the headrest while the stay is mounted in the seat back.

DESCRIPTION OF SYMBOLS

100: main bracket 300: stay
310: horizontal bar 510, 510a, 510b: lock link
400a, 400b: first hinge shaft 400c: line shaft
400d: second hinge shaft
520, 550, 560: first, second, and third twisted coil springs
530: release lever 540: ratchet
700: operating member 800: bumper

The invention claimed is:
1. A headrest folding device comprising:
a main bracket mounted in a seat back or a headrest;
a stay, mounted in any one of said seat back and said headrest, being rotated with respect to said main bracket so as to be moved between an upright (unfolding) position and a folding position;

a lock link having one end supported by said main bracket through a first hinge shaft and an other end engaged with a horizontal bar of said stay;

a first twisted coil spring having one end supported by said main bracket and an other end supported by said horizontal bar of said stay;

a release lever having one end supported by said main bracket through a second hinge shaft;

a ratchet which is rotatably supported by said main bracket through a line shaft, and wherein contact thereof with said lock link is released by said release lever;

a second twisted coil spring having one end supported by said main bracket and an other end supported by said release lever; and an operating member configured to apply operating force to the other end of said release lever.

2. The headrest folding device according to claim 1, wherein said main bracket comprises:

a front plate;

a pair of side plates which is formed at the left and the right sides of said front plate and bended backward;

a pair of coupling plates, in said side plates, bended towards the left and the right directions respectively; and an upper plate and a lower plate which are respectively formed at the upper and the lower sides of said front plate and bended backward, wherein an open slot disposed before the other end of said first twisted coil spring is pressed is formed in said upper plate.

3. The headrest folding device according to claim 1, wherein said lock link comprises:

a link plate;

a hinge hole formed in the upper side of said link plate;

a V-shaped groove formed in the lower end of said link plate; and a rear groove formed in the back side of said link plate and inserted into said horizontal bar, and fixed thereby; and said release lever comprises:

a lever main body having a length along the front to rear direction;

a rotation hole formed in the front side of said lever main body;

a stopping threshold formed in the front side of said lever main body; and a hanger portion formed in the rear side of said lever main body wherein said operating member is hanged, and said ratchet comprises:

a ratchet main body wherein a rotation hole is formed;

a V-shaped ridge formed in the upper side of said ratchet and being contacted with said V-shaped groove; and a stopping protrusion formed in the lower side of said ratchet main body and held in said stopping threshold.

4. The headrest folding device according to claim 3, wherein a stopper protrusion is formed in the front end side of said lever main body;

a slot which forms a space wherein said stopper protrusion can be rotated is formed in said front plate of said main bracket; and a stopper retaining plate wherein said stopper protrusion is held is formed in the lower end of said slot.

5. The headrest folding device according to claim 4, further comprising a third twisted coil spring having one end supported by said main bracket and an other end supported by said ratchet.

6. The headrest folding device according to claim 1, wherein said main bracket is mounted in said headrest, and said stay is mounted in said seat back, and said stay comprises a horizontal bar fixed to said lock link and a pair of vertical pipes installed in both sides of said horizontal bar respectively, wherein said operating member is a wire pulling the other end of said release lever, and said wire is disposed so as to be inserted into and passing through any one of said vertical pipes.

7. The headrest folding device according to claim 1, wherein said main bracket is mounted in said headrest, and said stay is mounted in said seat back, and said operating member is a button unit pushing the other end of said release lever.

8. The headrest folding device according to claim 7, wherein said lock link comprises:

a link plate;

a hinge hole formed in the upper side of said link plate;

a V-shaped groove formed in the upper end of said link plate; and a rear groove formed in the back side of said link plate and inserted into said horizontal bar, and fixed thereby; and said release lever comprises:

a lever main body having a length along the left to right direction;

a rotation hole formed in the right side of said lever main body;

a stopping threshold formed in the left side of said lever main body; and a pressing plate formed in the left side of said lever main body and being pressed by said button unit, wherein said pressing plate is disposed above said rotation hole, and said stopping threshold is disposed below said rotation hole, and said ratchet comprises:

a ratchet main body wherein said rotation hole is formed;

V-shaped ridge formed in the lower side of said ratchet main body and being contacted with said V-shaped groove; and a stopping protrusion formed in the upper side of said ratchet main body and held in said stopping threshold.

9. The headrest folding device according to claim 1, wherein a bumper is further installed in said main bracket so as to be in contact with said horizontal bar of said stay when said stay is in the upright position.

* * * * *